United States Patent
Bold et al.

(10) Patent No.: US 6,554,226 B2
(45) Date of Patent: Apr. 29, 2003

(54) SKIN OF AN AIRPLANE DOOR AND METHOD OF MAKING DOOR WITH SAME

(75) Inventors: Jens Bold, Hamburg (DE); Guenther Klockow, Nordendorf (DE)

(73) Assignee: Eurocopter Deutschland GmbH, Donauwoerth (DE)

(*) Notice: Subject to any disclaimer, the term of this patent is extended or adjusted under 35 U.S.C. 154(b) by 0 days.

(21) Appl. No.: 09/908,729

(22) Filed: Jul. 20, 2001

(65) Prior Publication Data

US 2002/0043588 A1 Apr. 18, 2002

(30) Foreign Application Priority Data

Jul. 20, 2000 (DE) .......................... 100 35 334

(51) Int. Cl.[7] ................................. B64C 1/14
(52) U.S. Cl. ................... 244/129.5; 244/117 R
(58) Field of Search ............... 244/117 R, 119, 244/129.1, 129.3, 129.4; 160/88, 352; 49/40

(56) References Cited

U.S. PATENT DOCUMENTS

| | | | |
|---|---|---|---|
| 2,741,447 A | * 4/1956 | Heal ........................ 244/119 |
| 2,806,663 A | * 9/1957 | Rosenblatt .............. 244/117 R |
| 3,073,494 A | * 1/1963 | Riparbelli ................ 244/119 |
| 3,076,625 A | * 2/1963 | Griffith .................... 244/119 |
| 4,239,455 A | 12/1980 | Broekhuizen et al. |
| 4,676,720 A | 6/1987 | Niwa et al. |
| 4,720,065 A | * 1/1988 | Hamatani ............... 244/129.5 |
| 4,951,727 A | 8/1990 | Bybee |
| 5,110,260 A | 5/1992 | Byrnes et al. |
| 5,228,834 A | 7/1993 | Yamamoto et al. |
| 5,788,462 A | 8/1998 | Legendre et al. |
| 6,059,230 A | 5/2000 | Leggett et al. |

FOREIGN PATENT DOCUMENTS

| | | |
|---|---|---|
| DE | 3426876 | 12/1985 |
| DE | 3806594 | 3/1990 |
| EP | 0437870 | 12/1989 |
| EP | 0437870 | 7/1991 |
| GB | 793538 | 4/1958 |
| GB | 2145048 | 3/1985 |

* cited by examiner

*Primary Examiner*—Galen L. Barefoot
(74) *Attorney, Agent, or Firm*—Crowell & Moring LLP

(57) ABSTRACT

The skin of an airplane door conforms in use to a surrounding surface contour of an airplane fuselage. The skin is connected with a door frame which has supports arranged in a longitudinal direction of the fuselage and spaced with respect to one another in a circumferential direction. During flight the skin and door frame are exposed to a pressure load direction. To provide the skin of an airplane door with a clearly smaller dimension for the purpose of a light construction thereby avoid displacements on the skin, the skin and door frame are preformed against an in use pressure load direction. During the flight at cruising altitude, the door has essentially no displacements with respect to the surrounding surface contour of the fuselage, and thus essentially no displacements occur which could increase the flow resistance of the skin. Relative to a material, it is possible to thus construct the skin in a smaller thickness than in the case of known doors, but disturbing displacements on the skin are nevertheless essentially avoided while permitting a weight reduction of the door.

11 Claims, 3 Drawing Sheets

SKIN OF AN AIRPLANE DOOR AND METHOD OF MAKING DOOR WITH SAME

This application claims the priority of German Patent Document 100 35 334.7, filed Jul. 20, 2000, the disclosure of which is expressly incorporated by reference herein.

BACKGROUND AND SUMMARY OF THE INVENTION

The invention relates to the skin of an airplane door, which conforms to the surrounding surface contour of the fuselage, which is connected with a door frame, which door frame has supports arranged in the longitudinal direction of the fuselage and spaced with respect to one another in the circumferential direction, and which during the flight is exposed to a pressure load direction.

In the closed position, the skin of an airplane door conforms to the surface contour of the fuselage which surrounds it. The skin corresponds to the outer wall of the door. It essentially has a constant material thickness and seals off the door opening in the closed position and, without any transition, conforms to the surface contour of the fuselage. It is therefore uniformly curved in the circumferential direction and has no elevations or indentations. Recessed grips are covered.

The normal form of the skin of an airplane door corresponds to the original form of the skin, as manufactured. The skin exhibits its normal shape before and after the landing of the airplane.

The skin of the airplane door is fastened on supports which are arranged horizontally along the door width. The supports are therefore aligned in the longitudinal direction of the fuselage. These supports are spaced with respect to one another in the circumferential direction and are fixedly connected with the skin. Bearing elements, which rest on stop devices of the fuselage-side frame when the door is in the closed position, are arranged at the ends of the supports. These bearing elements make it possible that the supports of the door can be supported against a pressure load direction in the frame of the fuselage, and they prevent that, in the closed position, the door can change its position in the radial direction. The skin of the airplane door forms a portion of the outer surface of the airplane. On the door side toward the airplane cabin, the supports are covered with a planking.

The skin forms a so-called bearing area which has to absorb and transmit pressure loads and aerodynamic loads, while the inside planking is part of the so-called non-bearing area because a considerably lower stressing takes place there than on the skin.

After the start of the airplane, the pressure relationships between the airplane cabin and the outer atmosphere of the airplane change increasingly. While, inside the cabin, the pressure corresponds essentially to a known normal atmospheric pressure, the outside pressure will fall as the lift increases. This pressure difference between the airplane cabin and the atmospheric environment of the airplane results in an increasing pressure load upon the airplane door. This is increased by aerodynamic loads by atmospheric oncoming flows and whirls.

These pressure loads are absorbed by the door structure, are transmitted to the frame of the door and are transmitted from there, by way of the coupling of the bearing element and the stop element, onto the fuselage structure of the airplane.

Particularly the pressure load sucks the skin of the airplane door out of the fuselage position radially to the outside. The pressure loads applied to the door act in the direction of the pressure gradient, thus from the fuselage interior essentially in the direction toward the outside of the fuselage. Because of the elasticity of the bearing elements as well as of the stop devices, a very slight displacement of the entire door takes place in the radial direction.

However, there is also a displacement, that is, an arching-out, of the skin of the airplane door in the direction of the pressure drop. According to the existing regulations, such displacements on the skin of an airplane door may maximally have a defined value with respect to the normal shape of the skin.

Although they are relatively slight, these displacements, that is, archings, cause swirls which disadvantageously influence the flow resistance. This influences the fuel consumption of the airplane in a measurable manner.

This demand for slight reliable displacements on the skin is met in that the door receives a sufficient stiffness. This is achieved by the supports and in that the skin of the airplane door is dimensioned correspondingly thick and the door is disposed in a separate bearing with respect to the frame. This high stiffness of the door has the disadvantage that a light-weight construction of the previous door is not possible. In this case, the skin causes approximately 25% of the entire door weight.

It is an object of the invention to clearly reduce the dimension of the skin of an airplane door with a view to a light construction and in the process, if possible, avoid displacements on the skin.

The object is achieved by providing a skin of an airplane door, which conforms to the surrounding surface contour of the fuselage, which is connected with a door frame, which door frame has supports arranged in the longitudinal direction of the fuselage and spaced with respect to one another in the circumferential direction, and which during the flight is exposed to a pressure load direction, characterized in that a skin preformed against the pressure load direction is connected with supports of the door frame. The skin is preformed against the pressure load direction, and this preformed skin is connected with supports of the door frame. At cruising altitude, a pressure load to the skin takes place which has the result that the skin fits fluidically advantageously into the surface contour of the fuselage surrounding it. The resulting displacements are compensated by the preformed skin and cannot disadvantageously influence the flow resistance of the skin. This leads to measurable savings of fuel during the flight. By means of the invention, it is possible with respect to a material to construct the skin in a smaller thickness than in the case of known doors; disturbing displacements on the skin would nevertheless essentially be avoided. The invention thus permits a reduction of weight. By means of less material for the skin, clearly better characteristics of the door are achieved while the manufacturing expenditures are essentially the same.

According to an embodiment of the invention, it is advantageous to arch the skin in a center area along the longitudinal axis in an essentially concave fashion and to form an edge which is arched in the direction of the interior of the fuselage. Qualitatively, the profile of a preforming along the door width corresponds essentially to the indicated course of the curve $V_x(b)$. The point-focally different values of a preforming are a function of the material of the thickness of the skin and also of the geometry of the door.

In the case of a door cast in one piece, it is expedient to mill the preformed surface contour on the exterior side of the skin. In the case of a skin produced from a fiber composite, the preformed surface contour is achieved by means of the lamination.

DETAILED DESCRIPTION OF THE DRAWINGS

Figure 1:
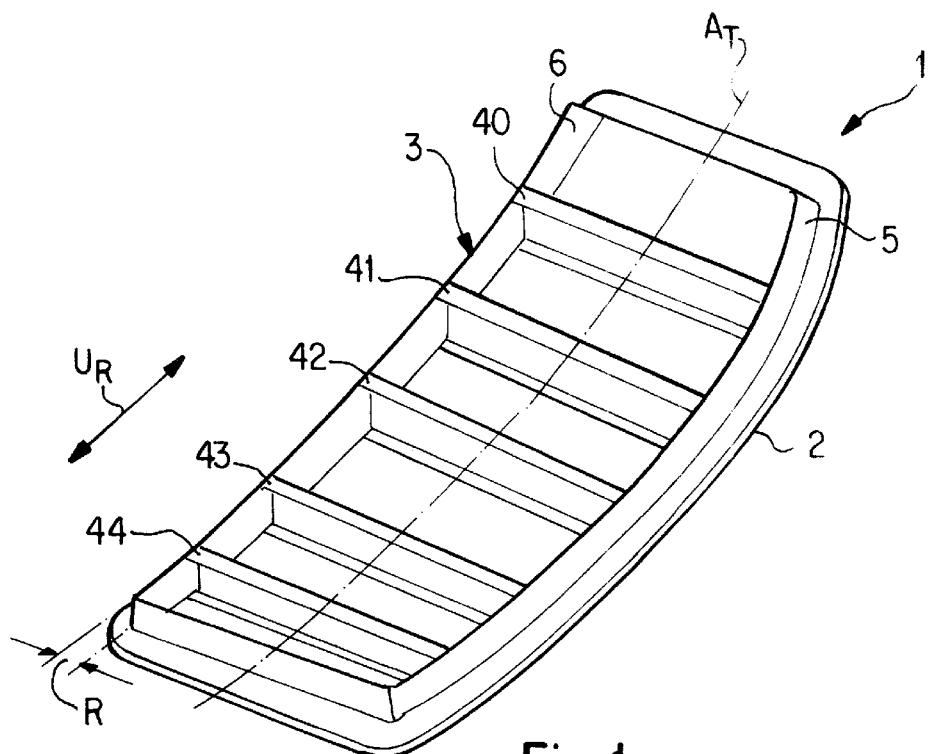
FIG. 1 is a schematic view of the structure of an airplane door, constructed according to preferred embodiments of the present invention.

FIG. 1 is a schematic view of the structure of an airplane door 1, particularly the skin 2 and the door frame 3 fastened with the skin 2. The skin 2 is arched in the circumferential direction $U_R$ corresponding to the surface contour of the airplane fuselage (not shown). In the case of a passenger door, for example, the frame 3 is formed of supports 40, 41, 42, 43, 44 which are aligned in the longitudinal direction of the fuselage. The supports extend approximately along the width of the door, a small edge R of the skin 2 existing which extends along the circumference. The supports are mutually spaced in the circumferential direction $U_R$. The ends of the supports are bounded by means of a rib 5, 6. Wherever a support is in contact with a rib, a bearing element (not shown) is arranged as a rule. Such bearing elements are known in the prior art and described there.

The skin has a constant material thickness and is essentially symmetrically constructed with respect to its longitudinal axis $A_T$.

With the reaching of the flight altitude, the airplane door is exposed to the pressure loads for the duration of the cruising flight. It was found that the displacements on the skin of the door differ within a permissible limit value. The displacements occur permanently when the airplane has taken off and reach their maximum when the cruising altitude has been reached.

Figure 2:
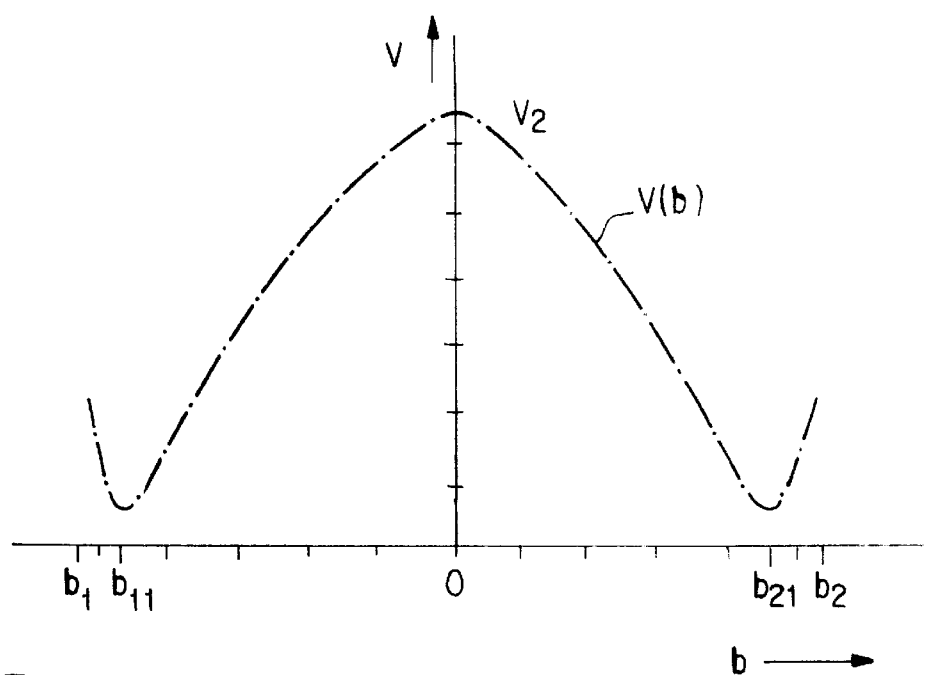
FIG. 2 is a view of the profile of the displacements on the skin of the door of FIG. 1 along the width of an airplane door at flight altitude.

FIG. 2 shows such displacements, as they occur at flight altitude (approximately 11,000 m) in the case of known doors which have a correspondingly large thickness of the skin and therefore achieve the required stiffness of the skin, so that the limit value of the displacement on the skin cannot be reached.

When the displacements are considered in a horizontal plane along the width of the door but this plane is in each case vertically offset in a spaced manner along the height of the door, sites of highest permissible displacements will occur as well as sites of a lowest displacement. Curve V(b) shows an average value of the permissible displacements of a door in the system of coordinates. The width b of the door is indicated as the abscissa. The width of the door essentially also corresponds to the width of the skin and is defined by the length of the distance between points $b_1$ and $b_2$. Since the skin is designed to be essentially symmetrical with respect to its longitudinal axis $A_T$, the origin of the coordinates was for practical reasons placed in the longitudinal axis $A_T$. The ordinate indicates the displacements V of the skin with respect to the normal shape of the skin and thus with respect to the source position of the skin. The source position is illustrated by the abscissa at $V_0=0$. According to the known prior art, the source position of the normal shape of the skin corresponds to a condition exhibited at the known normal pressure of the atmosphere. However, at cruising altitude, the displacement position, instead of the source position $V_0$, becomes the applicable viewing basis. The curve V(b) is not true to scale and supplies only qualitative information in this respect.

The curve V(b) shows that, because of an elasticity of the bearing elements as well as of the stop devices, the entire door is displaced very slightly radially out of its source position $V_0$ into a new position, a displacement position $V_1$. When now, starting from the displacement position $V_1$, the displacements V of the skin along the width b of the door are considered, it is found that a relatively large displacement occurs at the door edge R of FIG. 1; 20 of FIG. 5), for example, $b_1$, which rapidly decreases in the direction of the bearing element. No displacement exists where the bearing element is connected with the door, that is, with the support ($b_{11}$). The displacement increases from there further into the direction of the door center (that is, in the direction of the longitudinal axis $A_T$) and may reach its maximally permissible value.

The displacement decreases further in the direction of the other edge and also can hardly be found there on the bearing element ($b_{21}$) on the other side, in order to then rapidly increase again in the direction of the other edge, for example, $b_2$.

In the case of the known doors, the material thickness of the skin is selected such that the stiffness of the skin is always ensured and material tensions produce only maximally permissible displacements. In order to reduce these displacements, the invention suggests to bring the normal shape of the skin known from the prior art into a preformed condition which deviates from the known normal shape. This shape, which deviates from the known normal shape, is called "preformed shape".

The result of a manufacturing is a door with a preformed skin. The preformed skin does not correspond to the known normal shape of the skin as exhibited in the source position.

The preformed skin now corresponds to an original shape of the skin occurring on the basis of the manufacturing.

Before the take-off or after the landing, the skin is always exhibited in the preformed shape. This preformed shape shows deformations which deviate from the source position and which are opposed to the deformations during the flight, so that the deformations from the displacement position occurring during the flight are compensated by the predeformations produced during the manufacturing. During the flight at cruising altitude, this results in a door which essentially has no displacements with respect to the surrounding surface contour of the fuselage and therefore ideally permits no displacements from the taken-up displacement position.

Figure 3:
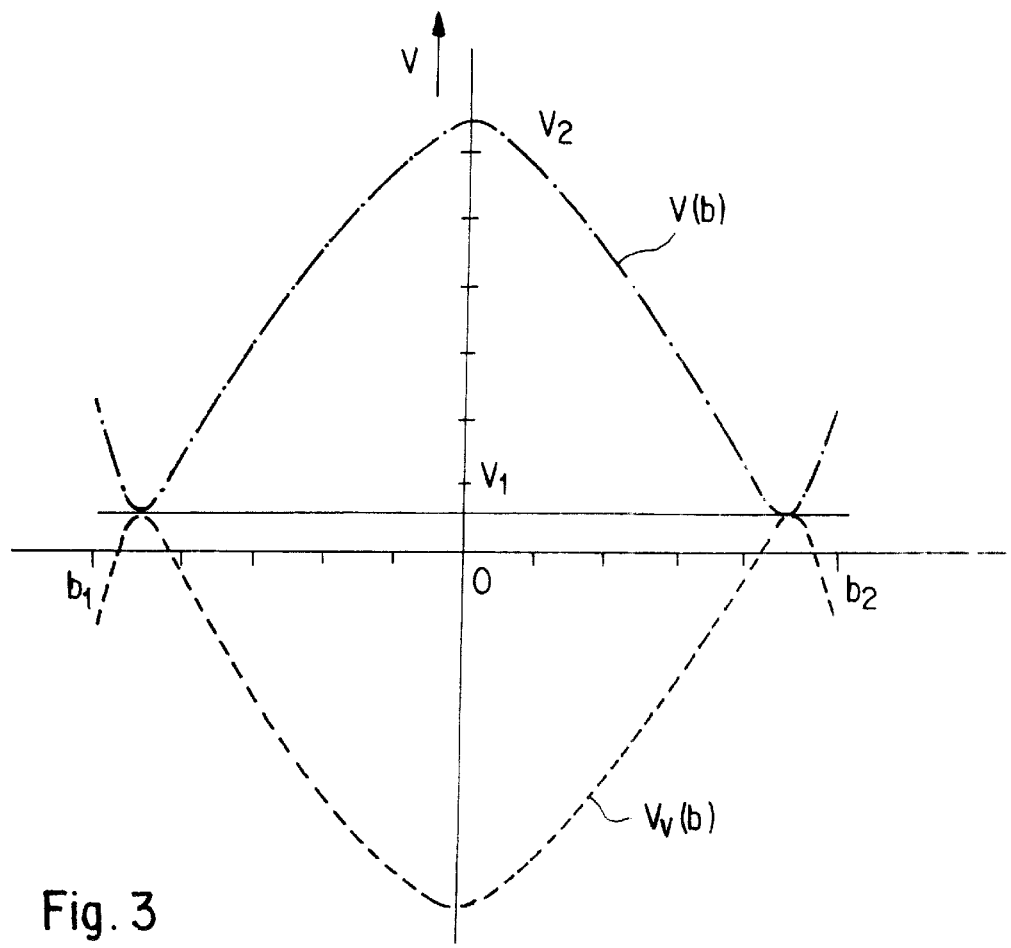
FIG. 3 is a view of the profile of the door of FIG. 1, showing preforming of a skin of the airplane door before the start.

FIG. 3 shows in which direction these predeformations on the skin have to be produced during the manufacturing in order to generate the preformed shape. The curve $V_v(b)$ shows the profile of the skin along the door width of a shape to be preformed.

The curve $V_v(b)$ qualitatively shows the direction of the predeformation which is to be produced on the skin during the manufacturing. In this case, it can be recognized that both edges are formed toward the inside (direction of the fuselage interior) by manufacturing, while the area where the bearing elements are fastened to the door or the support end remains free of deformations. This area of the support end forms the starting basis (that is, the source position or displacement position) for determining the quantitative magnitude of the predeformation. Further in the direction of the door center, the skin is also preformed to a greater degree toward the inside in the direction of the cabin interior, that is, against the later direction of the pressure load. By means of the cure $V_y$, FIG. 3 shows the predeformation along the width of the door in the profile. These predeformations corresponding to the profile extend along the longitudinal axis $A_T$ of the door from the top side to the bottom side of the skin.

Figure 4:
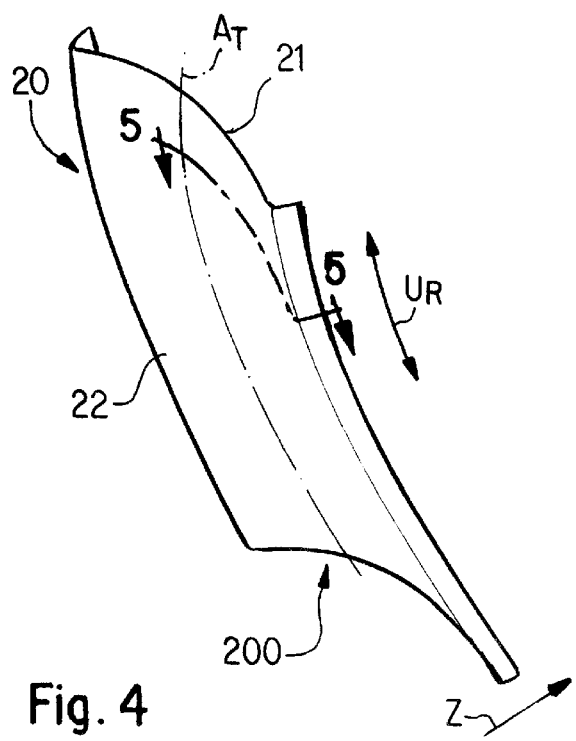
FIG. 4 is a view of an example of a preformed skin according to the present invention.

FIG. 4 illustrates a preformed skin 20 produced by manufacturing which is connected by means of its interior side 21 with a door frame 30. The exterior side 22 of the skin 20 exhibits a concave predeformation in the proximity of the longitudinal axis $A_T$ (center area 200). In this case, the skin 20 is further arched in the circumferential direction $U_R$. The edge R is arched in the direction (Z) of the fuselage interior.

Figure 5:
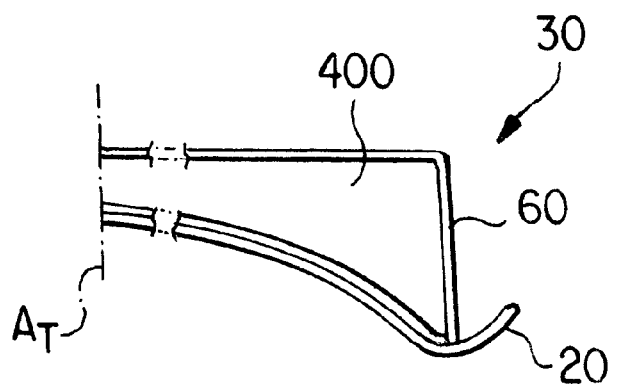
FIG. 5 is a sectional view A—A from FIG. 4 shown in a condition on an airplane on the ground.
Figure 5A:
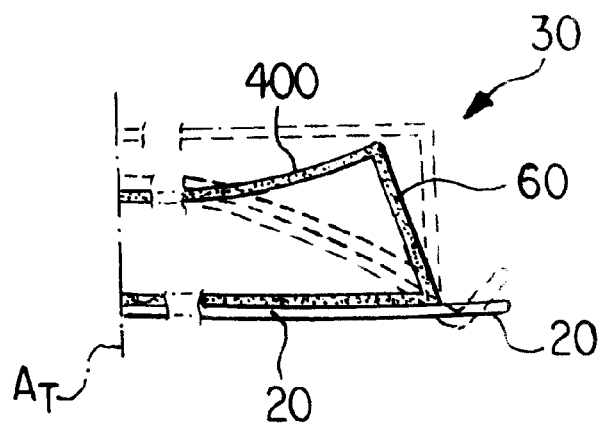
FIG. 5A is a sectional view similar to FIG. 5, shown in a condition on an airplane at a high in-air cruising altitude.

FIG. 5 illustrates a corresponding section A—A. The door frame 30 conforms, for example, to the contour of the skin 20. This is demonstrated on the support 400 and the rib 60 of that figure, which are components of the door frame 30. The support 400 and the rib 60 are, for example, riveted together with the skin 20. However, other methods can also be used for the connection. FIG. 5A schematically shows in solid line the deformation of the skin 20 and frame member 400 at cruising altitude. It should be understood that the skin (and frame members connected therewith) elastically deform by only a few millimeters from the position shown in FIG. 5 to the position shown in FIG. 5A.

Different manufacturing-related possibilities exist for deforming the skin. The manufacturing-related possibility is a function of the method of manufacturing the door. A conventional door riveted together from individual components offers the possibility of riveting the material of the skin in a preformed position with respect to the supports. In this case, the support has a recess in order to accommodate the deformation of the skin in a form-fitting manner. No limitations exist for fixing the preformed skin on the door frame. There are also no restrictions with respect to the material to be preformed.

In the case of a door produced by casting, which was cast in one piece, the interior side of the skin as a rule has the desired contour, in which case the contour of the skin must still be milled (on its exterior side). The thickness of the skin must remain constant. When the skin is manufactured from a fiber composite, the predeformation has to be laminated correspondingly already during the lamination of the skin.

The invention has the advantage that, during the entire cruising time at cruising altitude, essentially no displacements can form on the skin of the door in a fluidically disadvantageous manner, so that the flow resistance of the door can clearly be reduced. This leads to measurable savings of fuel. Relative to the material, it is possible by means of the invention to construct the skin in a smaller thickness than in the case of known door, but disturbing displacements on the skin are nevertheless essentially avoided. The invention therefore permits a reduction of weight. Clearly better characteristics of the door are achieved by means of less material for the skin while the manufacturing expenditures are essentially the same.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Skin of an airplane door, which conforms in use to a surrounding surface contour of an airplane fuselage, said skin being connected with a door frame which has supports arranged in a longitudinal direction of the fuselage and spaced with respect to one another in a circumferential direction, said skin being expose during flight to internal fuselage pressures acting in a pressure load direction, and wherein the skin is connected with the supports of the door frame and is preformed against said pressure load direction of the internal fuselage pressures with a predetermined shape extending inwardly of the airplane fuselage, said predetermined shape being selected such that when the airplane with the door is at cruising altitude the internal fuselage pressures deform the skin away from the predetermined shape so as to conform the exterior of the skin with adjacent exterior surfaces of the fuselage.

2. Skin according to claim 1, wherein the skin is essentially concavely arched in a center area along a longitudinal axis and an edge is formed which is arched in a direction of the fuselage interior.

3. Skin according to claim 1, wherein the profile of a predeformation along the door width essentially follows a course of the curve $V_y$.

4. Skin according to claim 1, Therein a preformed surface contour is milled onto the exterior side of the skin of a door cast in one piece.

5. Skin according to claim 1, wherein a preformed surface contour of the skin is a laminated skin produced from a fiber composite.

6. An airplane door assembly comprising:

a door frame, and a skin connected to the door frame, wherein the skin and door frame are formed with a predetermined shape extending inwardly of an airplane fuselage accommodating the door in a position of an airplane at ground level, said predetermined shape being selected such that when the airplane with the door is at cruising altitude the internal fuselage pressures deform the skin and door frame away from the predetermined shape so as to conform the exterior of the skin with adjacent exterior surfaces of the fuselage.

7. An assembly according to claim 6, wherein a preformed surface contour can be milled onto the exterior side of the skin of a door cast in one piece.

8. An assembly according to claim 6, wherein a preformed surface contour of the skin can be a laminated skin produced from a fiber composite.

9. A method of making an airplane door assembly comprising:

providing a door frame, and connecting a skin to the door frame, wherein the skin and door frame are formed with a predetermined shape extending inwardly of an airplane fuselage accommodating the door in a position of an airplane at ground level, said predetermined shape being selected such that when the airplane with the door is at cruising altitude the internal fuselage pressures deform the skin and door frame away from the predetermined shape so as to conform the exterior of the skin with adjacent exterior surfaces of the fuselage.

10. A method of making an airplane door assembly according to claim 9, wherein a preformed surface contour is milled onto the exterior side of the skin of a door cast in one piece.

11. A method of making an airplane door assembly according to claim 9, wherein a preformed surface contour of the skin is a laminated skin produced from a fiber composite.

* * * * *